Patented May 23, 1939

2,159,683

UNITED STATES PATENT OFFICE 2,159,683

PROCESS FOR THE PRODUCTION OF PHOTOGRAPHIC PICTURES IN NATURAL COLORS IN ACCORDANCE WITH THE THREE-COLOR PRINCIPLE

Marcelle Beauvais, Saint-Maurice, France, assignor to Siméon Papadakis, Saint-Maurice (Seine) France No Drawing. Application September 1, 1936, Serial No. 98,979. In France September 7, 1935

2 Claims. (Cl. 95—2)

This invention relates to a process for the production of photographic pictures in natural colors in accordance with the three color principle.

The processes hitherto proposed in the field of photography and cinematography for the obtaining of three color pictures in their natural colors have required a transparent carrier which is covered on both sides with coatings of which the one carries one of the images of the selection, while the other carries the other two images.

This dividing up of the colors on two opposite surfaces presents the following drawbacks:

(1) On account of the double coating the films are very considerably more troublesome to handle than films with a single coating.

(2) Since the two sides of the film have to be treated separately with suitable reagents and dyestuffs very complicated devices are required to protect the one of the two sides during the treatment of the other.

(3) Since the three color picture is composed of two constituent parts which are separated from each other by the thickness of the carrier there results a diffusion or refraction of the rays of light, which detracts from the clearness of definition in reproduction.

It is the object of the present invention to obviate these imperfections by the employment of a single coating preferably consisting of the silver-bromide emulsion known to commerce.

It follows that the carrier may consist of any desired material, so that the process according to the present invention is equally well suited for color photography on paper, glass, or film, or for color cinematography, which will constitute the most important sphere of application of the invention.

The aim of the invention is the reproduction of any colored object from three selected monochromatic negatives which may be obtained simultaneously or consecutively by means of a photographic or cinematographic camera equipped with an optical device for exposing in three colors.

The present invention does not relate either to the exposing apparatus intended to give three negative images of the object photographed, the first through a red-orange filter (copy in blue), the second through a green filter (copy in red), the third through a blue-violet filter (copy in yellow), nor to devices for making copies, allowing of the accurate superposition of the positive images provided by the above-mentioned negatives.

The following is the order of steps or operations which go to make up the process according to the present invention:

First of all, the sensitive silver bromide emulsion layer is exposed to one of the three negatives, then developed and fixed. There is thus obtained a black positive image which is converted into a colored image by the known mordant process.

The two other colored images must then be applied to this first image. For this purpose there are first produced two auxiliary silver positive images which correspond to the two remaining monochromatic negatives, and which serve for applying, by contact, the second and then the third image to the monochromatic image obtained by mordanting. These two auxiliary matrices serve of course for the subsequent production of any desired number of copies.

The mordanted image is then sensitized, for example by means of an alkali bichromate, and dried. Then it is exposed to light behind the above-mentioned black diapositive selected for the second color, care being taken to ensure that the outlines of the images coincide exactly. After exposure the gelatine of the sensitized image has become impervious at the parts which correspond to the light parts of the positive matrix, while the parts corresponding to the dark portions of the matrix remain more or less transparent. After washing, the film is immersed in a dye bath corresponding to the second of the three colors, and the second colored image appears. The monochromatic image is thus converted into a bichromatic image.

After drying, this bichromatic image is once more sensitized in a bath of an alkali bichromate, and then dried. The same sequence of the above-described steps is then repeated with the employment of the diapositive matrix of the third color. The process of rendering the gelatine impervious to light is repeated for the second image, and by the employment of a dye bath in the color of the third of the three colors there is finally obtained a trichromatic image in the natural colors.

The above description indicates the general conduct of the process. The invention however also covers the technical details of the carrying out of this process, since it has been found that the process is only capable of giving satisfactory results provided certain dyestuffs be used and a certain order observed in the carrying out of the steps of the process.

In actual fact the following difficulties are encountered:

(1) For the coloring processes by mordanting there are employed primarily basic dyestuffs, whereas the processes with bichromate gelatine (Hydrotype or Pinatype processes) necessitate the employment of certain acid dyestuffs. Now the basic and the acid dyes react upon each other, and tend in general to form lakes of mixed color.

(2) The basic dyes fixed by means of the mordant form a lake which, generally speaking, is inimical to the penetration of acid dyes at the parts already saturated with a basic dye, with the result that it is impossible to obtain an accurate second and third image.

(3) Certain basic dyestuffs can not withstand sensitization by means of bichromates, and become dissolved or change their color.

The process according to the invention can, however, be employed, and the above-mentioned drawbacks avoided, provided a certain order be observed in the sequence of the monochromatic images, and certain dyestuffs, specified below, be used.

The above-mentioned order is as follows:—
First of all the blue image is produced by copying and color-mordanting. This mordanting (dyeing) is effected by means of a basic dyestuff which does not have any effect upon the subsequent forming of the images by means of bichromates, nor is attacked by the same. As blue dyestuff there is employed capri blue G O N the dimethyl-diethyldiamine-methyldipheneoxazine, No. 991 (Schultz Tables, 7th edition), rhoduline 6 C, (or the hydrochlorate of tetramethyl-p-amino-o-chlor-fuchsonimonium, No. 755, (same tables) or thionine the hydrochlorate, or chlorozincate of trimethylethyldiamino-diphenazthionium, No. 1042 (same tables).

The second image, to be superposed upon the blue image, is the red image. For this coloring there may be employed Pinatype red, or the dye known as "Red R", trade names of dyes of unknown composition produced only by the Hoechst Dye Works.

The third image, which is placed over the two preceding ones, is the yellow image. For this coloration there is employed the dye of undisclosed composition manufactured by the Hoechst Dye Works under the trade name "Yellow F".

The various dyestuffs specified above have been tried out in the practising of the process according to the invention. Any other dyestuffs may however be employed which have similar properties, without departing from the spirit and scope of the invention which relates broadly to the employment of dyestuffs and reagents of a nature not to react with each other and to withstand the treatment involved in the various steps described above.

The application of the dyestuffs and reagents to the image carrier is effected, according to a further feature of the invention, by simple immersion in the appropriate baths, or alternatively by superficial application of the dyestuffs and reagents by means of special devices.

Example

The following is an example of the preferred manner in which the process according to the present invention is carried out.

The positive silver image obtained from the original negative (taken through the red screen) is first mordanted by one of the known processes, that using thiocyanates being preferred for this purpose. The image is then dyed blue with the use of one of the dyes specified above (in a solution of approximately 1% strength).

After washing for the purpose of removing surplus dye the strip is dried, and then sensitized with a moderately weak solution (2.5–3%) of potassium or ammonium bichromate.

After drying, the blue image is secured beneath a diapositive corresponding to the green screen and exposed, to obtain a monochromatic red image for superposition on the monochromatic blue image.

After washing of the exposed image this latter is placed in a bath of a 1–2% solution of one of the red dyes specified above, preferably Pinatype Red F which is a trade name for a dye of undisclosed composition (ammoniacal crimson lake), but without an excess of alkali, and then washed.

The bichromatic red-blue image is then dried, and once more sensitized with bichromate, but this time with a solution of higher concentration than before (4½ to 5½%), and finally exposed behind a diapositive corresponding to the blue-violet screen in order to obtain a monochromatic yellow image. This exposure is longer than the first.

After washing, the red and blue bichromatic image is introduced into a bath of yellow dye, and preferably of the Pinatype Yellow F which is the trade name for a dye of undisclosed composition produced by the Hoechst Dye Works. As soon as the coloration has become sufficient the strip is washed, and then dried. In this manner there is obtained a three color film with but one single coating.

I claim:

1. The process for the production of a natural color photograph which consists in first taking, in a known manner, three negatives of the object through three differently colored light filters, coating a carrier with photographic emulsion on one side only, printing out one of the said negatives directly on to the said carrier, dyemordanting the resulting image by a basic mordanting dyestuff, preparing positive copies of the other two of the said negatives on temporary transparent carriers, re-sensitizing the image on the main carrier by bichromates, exposing the thus sensitized layer through one of the said positives, dyeing the resulting second image with a dye selected from the group consisting of Pinatype red, and Hoechst "Red R", re-sensitizing the image thus obtained by bichromates, exposing this sensitized layer through the other of the said positives, and finally dyeing the resulting third image yellow with Hoechst "Yellow F".

2. The process for the production of a natural color photograph which consists in first taking, in a known manner, three negatives of the object through three differently colored light filters, coating a carrier with photographic emulsion on one side only, printing out one of the said negatives directly on to the said carrier, dyemordanting the resulting image by a basic mordanting dyestuff selected from the group consisting of capri blue G O N, rhoduline 60, and thionine, preparing positive copies of the other two of the said negatives on temporary transparent carriers, re-sensitizing the image on the main carrier by bichromates, exposing the thus sensitized layer through one of the said positives, dyeing the resulting second image with a dye selected from the group consisting of Pinatype red, and Hoechst "Red R", re-sensitizing the image thus obtained by bichromates, exposing this sensitized layer through the other of the said positives, and finally dyeing the resulting third image yellow with Hoechst "Yellow F".

MARCELLE BEAUVAIS.